June 18, 1940.  E. H. MICHAELSEN  2,204,864
SHUTTER FOR MOTION PICTURE PROJECTORS
Filed Nov. 26, 1938
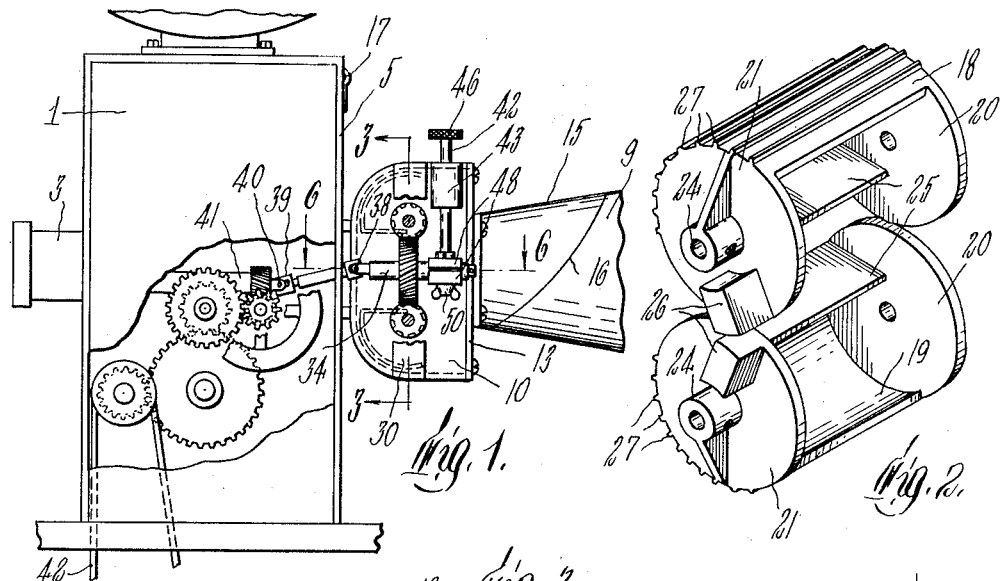
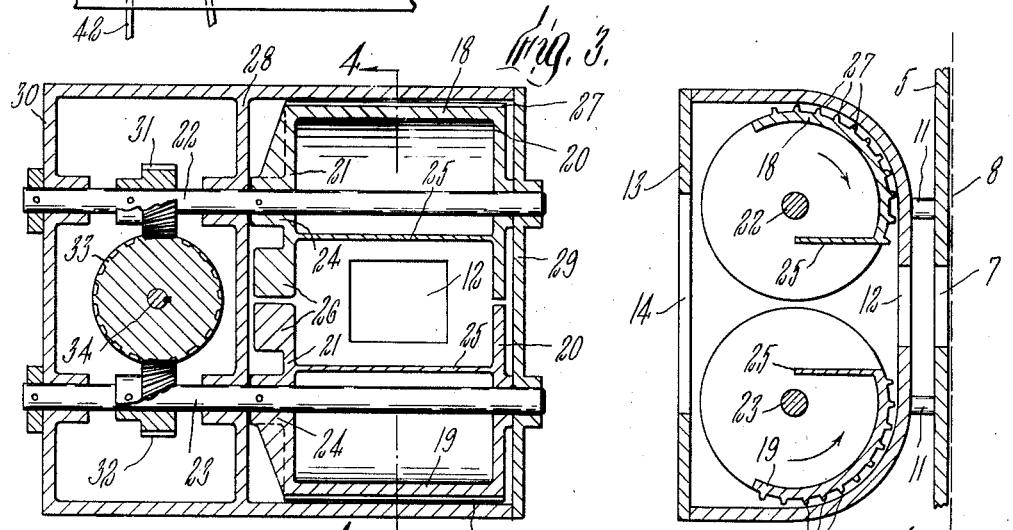
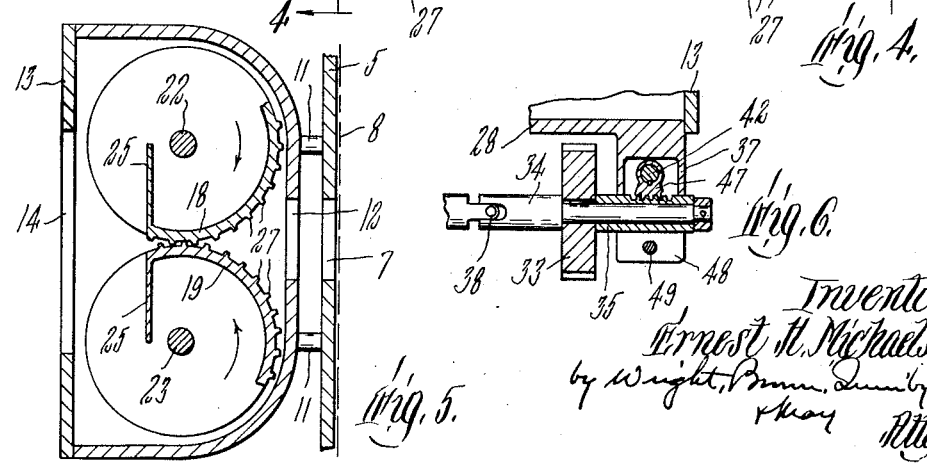
Inventor
Ernest H. Michaelsen Patented June 18, 1940

2,204,864

UNITED STATES PATENT OFFICE 2,204,864

SHUTTER FOR MOTION PICTURE PROJECTORS

Ernest H. Michaelsen, Quincy, Mass.

Application November 26, 1938, Serial No. 242,521

9 Claims. (Cl. 88—19.3)

The purpose of this invention is to provide an improved and superior shutter for use in motion picture projectors, and as a part of the combination in projection machines, by which to obtain improved effects in cutting off the light when the film is advanced and during pauses of the film (for the purpose of reducing flicker); and to avoid or overcome objectionable effects, such as excessive heating of the film, encountered with shutters heretofore used.

At the present time two types of shutter are used with commercial projection machines. One type employs a blade which rotates about an axis at one side of the path of the film and moves periodically across the aperture through which the light beam passes and across which the film travels. The other is the so called barrel type, consisting of a cylinder with apertures in its side walls at diametrically opposite sides of its axis, which is mounted with the axis squarely across the middle of the light beam aperture. Shutters of the second type are in more common and extensive use at the present time than are those of the type first mentioned. Neither type is perfectly satisfactory. The blade type shutter cuts off the light progressively from one boundary of the aperture to the opposite boundary, when occluding the aperture; and correspondingly admits the light progressively when passing out of occluding position. Thus it fails to effect occlusion simultaneously from opposite boundaries and its occluding and opening action is not so rapid and sharp as is desirable to throw clearly defined pictures on the screen with bright enough illumination and at the same time prevent haziness or blurring due to the shifting of the film. The barrel type shutter, while it occludes from both opposite boundaries of the aperture simultaneously, effects occlusion by edges of apertures in its own sides at different distances from the film. That is, assuming, for instance, that the aperture in the side of the shutter next to the film is moving upward, its lower edge then commences to cut off the light from the picture while the upper edge of the aperture in the opposite side of the shutter commences to cut off the light from the upper side of the picture. But as these apertures are at different distances from the film, the occluding edge of the more remote aperture does not cut off the light so sharply and accurately as the nearer one.

In both types of shutter the heating problem is extremely serious. The high intensity arc lamps, which are a necessity in large picture houses where large screens are used, develop great heat, which is focused on an area including, and not greatly larger than, the fixed aperture over which the film passes. Depending on the adequacy of ventilation provided in the projection booth, the temperature at the film may be anywhere from 900° F. to 1400° F. Higher temperatures are found where the barrel type shutter is used than with the blade type shutter, but the difference is not great; and its superiority in occluding effects causes the barrel type shutter to be more generally favored.

These high temperatures are exceedingly harmful to films. They cause drying and buckling of the film, making it brittle and liable to crack or break in transit, and requiring films to be reconditioned after an exhibition. Buckling causes parts of the picture to be thrown out of focus. The harmful effects of these high temperatures are of course greater the higher the temperature; but they are serious indeed where the temperature at the film is no higher than 800° or 900°. The result of drying out of the films shortens their effective life and imposes expense in repairing breaks or cracks and in reconditioning them by subjection to plasticizing agents.

The invention which is the subject of this specification reduces the heating effect and makes the image of the picture on the screen more distinct and the illusion of motion by the figures in the picture more perfect by a superior mode of intercepting and restoring the light beam back of the film. It comprises a shutter made of two cylindrical segments rotating about parallel axes at opposite sides of the light beam so as to roll together and apart, and having means for dissipating heat absorbed from the beam, for preventing passage of light between them when in occluding position, and for causing a circulation of air with cooling effect on the film. A preferred embodiment of the invention is described in the following specification and illustrated in the drawing provided herewith.

In the drawing:

Fig. 1 is a side elevation of a projection machine containing a shutter embodying this invention, parts being broken away to show the driving mechanism;

Fig. 2 is a perspective view of the shutter removed from all supporting and driving parts of the machine, but showing the elements of the shutter in their cooperative relationship;

Fig. 3 is a sectional view taken on line 3—3 of Fig. 1, and represented on a larger scale, showing the shutter mounted in its housing, together with the proximate supporting and driving means;

Fig. 4 is a cross section on line 4—4 of Fig. 3 showing the shutter in open position;

Fig. 5 is a view similar to Fig. 4 but showing the shutter in occluding position;

Fig. 6 is a detail sectional view taken on line 6—6 of Fig. 1 and shown on the same scale as Figs. 3–5;

Like reference characters designate the same parts wherever they occur in all the figures.

The projection machine represented in Fig. 1 is a standard machine in common use for the showing of moving pictures, except for the substitution of my novel shutter, and typifies any such machine. It comprises a casing 1 on the top of which the film reels are mounted and having a tube 3 in its front side containing the usual equipment of lenses for projection of the picture on the screen. In the rear wall of the casing is hinged the usual gate 5 having the aperture 7 (see Figs. 4 and 5) across the inner face of which the film is caused to travel in a path indicated approximately by the broken line 8. The means for guiding the film and propelling it with an intermittent motion are not shown here, for these means form no part of the invention and may be of any character heretofore known or which may be developed suitable for the purpose. The light source is not shown, but may be understood as being an arc lamp of high intensity, such as is commonly used, located a suitable distance away at the right from Fig. 1, having optical equipment for directing a convergent beam of light through the opaque tube 9 toward the aperture 7 in an area centered on and including said aperture in the plane of the latter. A shutter housing 10 is mounted on the outer side of the gate 5 by posts 11 or other suitable means and contains an aperture 12 in alinement with the aperture 7 on the axis of the light beam and of the tube 3. This housing includes a rear wall 13 in which there is an opening 14 and on the outer side of which is secured a section 15 of the tube 9 enclosing the opening 14 and divided from the main portion of the tube 9 on a cylindrical cleavage line 16 coaxial with the hinge 17 of the gate to permit displacement of the gate necessary for threading in and adjusting films with respect to the propelling mechanism.

The shutter consists of two partial hollow cylinders, or cylindrical segments 18 and 19. For convenience of mounting and operation, each segment is preferably made as part of an integral casting with circular heads 20 and 21 at opposite ends which are centrally perforated to admit shafts 22 and 23. The head at one end has a hub 24 in which a set screw may be mounted for securing the segment to its shaft, or a pin may be passed through it for the same purpose. A vane or shield 25 is preferably associated with each segment. Such vane extends from head to head and from a junction with the segment to a point nearer the axis. As shown here, the junction is with the leading edge of the segment and the vane is tangent to a coaxial cylinder of shorter radius than the segment. But it may be radial if desired, and may be located at other points with respect to the segment. The weight of the segment and shield is counterbalanced by a mass 26 on the head 21 at the opposite side of the axis. On the outer surface of each segment are parallel ribs or fins 27 separated by intermediate grooves and so spaced, with reference to the cooperating relationship of the two shutter elements, that the ribs of one element intermesh with those of the other element when the segments occupy the light occluding portion of their cycle.

All of the parts herein described of each shutter element may be made as a single integral casting of any suitable metal, or may be molded from a suitable plastic material other than metal, or may be fabricated otherwise of suitable parts. The details of manufacture are relatively unimportant provided only that the cooperative structural and functional essentials hereinafter explained are present.

The shafts 22 and 23 on which the shutter elements are mounted pass through the end walls 28 and 29 of the housing and a supporting frame 30 mounted on one end of the housing, in which they have bearings. These shafts are parallel to one another and are located respectively above and below the aperture 12, substantially as shown in the drawing, and the shutter segments have a radius longer than half the height of the aperture and approximately equal to half the distance between the shafts. The shutter elements are relatively located to approach the line of centers from above and below the aperture and to come nearly or approximately into contact with one another on a horizontal plane midway between the top and bottom boundaries of the aperture. The ribs 27 of the two elements, being intermeshed as shown in Fig. 5, prevent passage of light through the slit or crack between the segments. The vanes 25 assist in preventing light from reaching the aperture when the shutter elements are approaching the fully occluding position, but are not essential for that purpose. However, they have an important function and effect as means for circulating air. The external ribs 27 also cause a current of air, and have the further effect, when removed from the light beam, of dissipating heat absorbed by the shutter elements.

In the space between the housing wall 28 and the frame 30 helical gears 31 and 32 are mounted on the shafts 22 and 23 in the same plane perpendicular to the shafts. Both gears mesh with an intermediate helical gear 33 in a plane perpendicular to that of the previously named gears and mounted on a shaft 34 rotating in a bushing 35 (see Fig. 6) which is slidingly mounted in a bracket 37 on the housing wall 28. Shaft 34 is connected by a universal joint 38 with a telescopic shaft 39 and the latter is connected by a universal joint 40 with a shaft 41 on the slide within the main casing which is provided with all motion picture projectors for properly framing the picture. Shaft 41 is driven from a motor, not shown, by a belt 42 and a train of transmission gearing, shown in Fig. 1. The gearing thus illustrated is standard for at least one make of commercial projectors now in common use and need not be described here.

The telescopic shaft 39 and universal joints 38 and 40 permit adjustment of the film and its guiding and driving means for proper framing and adjustment of the shutter for timing with the film. The latter adjustment is effected by moving the intermediate helical gear 33 endwise whereby, without rotation, its inclined teeth and the inclined meshing teeth of the gears 31 and 32 cause simultaneous angular adjustment, in relatively opposite directions, of the shutter elements. A shaft 42 for this purpose is mounted in the bearing 37 and a bearing 43, carrying on its exposed end a knob 46 and carrying beside the sleeve 35 a gear segment 47 meshing with rack teeth on the side of the sleeve. The guideway for the sleeve 35 in bearing 37 is divided at one side and provided with separated wings 48 through which a screw 49 passes having a nut 50 for clamping the sleeve immovably after being adjusted.

Preferably the shutter elements are rotated in the directions indicated by the arrows in Figs. 4 and 5. This gives perhaps the best effect in shutting off the light. But they may be rotated in the opposite direction with nearly as good effect and without departure from the invention. The advancing edges of the shutter segments approach one another at equal speed from the top and bottom of the aperture, and they are always in a plane parallel, or approximately so, to the plane of the film. The light is thus shut off simultaneously from the top and bottom of the picture; and when the shutter opens again the light beam first appears at the middle of the picture and instantaneously widens to include the whole area. In both closing and opening actions the edges of the shutter elements which limit the height of the light beam are always in planes parallel to the film. This is important in insuring equality and symmetry in the manner in which the illumination is occluded and restored.

The usual film feeding mechanisms advance the film with an intermittent motion, causing it to stand still for three quarters of each cycle and to be rapidly advanced during the remaining one quarter. The shutter is driven at a speed which causes it to shut off the light during the times when the film is advanced and also in the middle of each period when the film stands still. This latter occlusion is to avoid the appearance of flickering to the beholder. The angular extent of each segment must be sufficient to exclude light during the entire fraction of the film propelling cycle in which the film is moving, and is approximately twice as wide as would be required if the shutter rotated only once in each film feeding cycle. Under present conditions films are made with twenty four exposures per second for the regular run of pictures, and are advanced at the same rate in the projection machine. Consequently the shutter is rotated at 2880 revolutions per minute to obtain two occlusions with each step of the film.

In the rapid rotation of the shutter its vanes 25 and external ribs 27 cause a flow of air through the casing which carries away heat from the shutter, the part of the housing exposed to heat rays from the light source, and the film itself. I have found that a substantial lowering of temperature follows from the use of this shutter, the temperature at the film being between 480° and 520° under the same conditions, where the temperature, when a barrel type shutter was used, was over 1000°. I have described the shutter as arranged so as to close from the top to the bottom of the picture toward the middle, and open from the middle toward the top and bottom. This is indeed the preferred arrangement, but it is not essential, and the shutter may be arranged to close from the opposite sides and open laterally from the middle toward the sides. In other words, it may be mounted with the axes vertical instead of horizontal; or, if any occasion arises for doing so, with the axes inclined in any degree, without departing from the scope of the invention or the protection here claimed.

It is to be understood also that I claim the principles of this invention for all of the purposes and in all of the combinations in which it may be successfully used, as well as in the specific use of motion picture projection.

What I claim and desire to secure by Letters Patent is:

1. A shutter for use with a motion projector having an aperture across which a film may be passed and through which and said film a beam of light is projected, said shutter consisting of two members mounted to rotate about axes located at respectively opposite sides of the said aperture and means for revolving said members simultaneously in relatively opposite directions, the members being angularly located with respect to their axes so as to approach each other from opposite sides of the prescribed path in which the light beam is directed on the aperture, and having a radial extent from their axes sufficient to overlap across such path, and each having a plurality of edges in series so arranged that succeeding edges of the respective series overlap before the next preceding edges withdraw from their overlapping relationship.

2. A shutter comprising two segments of hollow cylinders rotatably mounted to turn about substantially parallel axes separated from one another by a distance approximately equal to the sum of the radii of said segments, means for rotating said segments simultaneously in relatively opposite directions and at substantially equal peripheral speeds, said segments being angularly related to one another so as to approach one another from opposite sides of the intervening space, roll approximately in surface contact, and separate.

3. A shutter comprising two segments of hollow cylinders rotatably mounted to turn about substantially parallel axes separated from one another by a distance approximately equal to the sum of the radii of said segments, means for rotating said segments simultaneously in relatively opposite directions and at substantially equal peripheral speeds, said segments being angularly related to one another so as to approach one another from opposite sides of the intervening space, roll approximately in surface contact, and separate, said segments having external longitudinal ribs and intermediate spaces located to effect overlapping of the ribs of each segment with those of the other when traveling in such approximate contact.

4. A shutter comprising two segments of hollow cylinders rotatably mounted to turn about substantially parallel axes separated from one another by a distance approximately equal to the sum of the radii of said segments, means for rotating said segments simultaneously in relatively opposite directions and at substantially equal peripheral speeds, said segments being angularly related to one another so as to approach one another from opposite sides of the intervening space, roll approximately in surface contact, and separate, said segments each having a vane extending from the segment inwardly with respect to the axis thereof.

5. A shutter comprising two segments of hollow cylinders rotatably mounted to turn about substantially parallel axes separated from one another by a distance approximately equal to the sum of the radii of said segments, means for rotating said segments simultaneously in relatively opposite directions and at substantially equal peripheral speeds, said segments being angularly related to one another so as to approach one another from opposite sides of the intervening space, roll approximately in surface contact, and separate, said segments each having a vane extending from one edge of the segment inwardly toward the axis thereof.

6. A shutter for motion picture projectors consisting of two elements and means for mounting said elements rotatably to turn about separated substantially parallel axes, each element comprising a segment of a substantially cylindrical wall, heads joined to the ends of said wall in planes substantially perpendicular to the axis thereof, a vane extending between the heads from a junction with said cylindrical wall to points nearer the axis of the element than the wall, and external longitudinal ribs on the wall; the external radii of both cylindrical walls being substantially equal and approximating half the distance between the said axes, and the cylindrical walls being angularly related to one another so as to roll together and apart with the external ribs of each entering and withdrawing from the intercostal spaces of the other.

7. A shutter for use with a light projecting machine having an aperture adapted to receive light in a given path from a light source, consisting of segments of cylindrical walls rotatably mounted to turn about axes at opposite sides of said path, and means for rotating said cylindrical walls simultaneously in opposite directions; said walls being mounted to roll together and apart in so rotating and having intermeshing external elements arranged to overlap the space between the walls when the latter are in their rolling relationship.

8. A shutter for use with a light projecting machine having an aperture, comprising two cooperating shutter elements mounted at relatively opposite sides of a plane perpendicular to the plane of said aperture and midway between two opposite boundaries thereof, each shutter element being a cylindrical segment mounted to rotate into an approximation of rolling engagement with the other element, helical gears connected coaxially, one with each of said elements, and an intermediate helical gear in mesh with both of the previously mentioned helical gears and located in a plane transverse thereto, and means for shifting said intermediate gear lengthwise of its axis whereby to adjust the timing relationship between the elements.

9. A shutter for use with motion picture projectors and analogous uses comprising two members mounted to rotate about substantially parallel axes at respectively opposite sides of the light path through an aperture, said members each having a plurality of external ribs projecting and relatively located to overlap the ribs of the other member during rotation; certain of said ribs being arranged thus to overlap during continuance of the overlapping relationship of the next preceding ribs.

ERNEST H. MICHAELSEN.